United States Patent [19]

Sakurai et al.

[11] Patent Number: 5,006,422
[45] Date of Patent: Apr. 9, 1991

[54] VISUAL MAGNETIC RECORDING MEDIUM AND METHOD OF MAKING THE SAME

[75] Inventors: Masaaki Sakurai, Utsunomiya; Mitsuru Yoda, Tokyo, both of Japan

[73] Assignee: The Nippon Signal Co., Ltd., Japan

[21] Appl. No.: 229,333

[22] Filed: Aug. 5, 1988

[30] Foreign Application Priority Data

Aug. 6, 1987 [JP] Japan .................................. 62-196659
Aug. 26, 1987 [JP] Japan .................................. 62-211629

[51] Int. Cl.$^5$ .............................................. G11B 23/00
[52] U.S. Cl. .................................... 428/694; 360/131; 428/900
[58] Field of Search ................... 283/72, 74, 82, 91, 283/109; 360/131; 428/694, 900

[56] References Cited

U.S. PATENT DOCUMENTS

4,499,126  2/1985  Suzuki et al. ........................ 283/82
4,707,593 11/1987  Murata et al. ........................ 283/82

Primary Examiner—Paul J. Thibodeau
Attorney, Agent, or Firm—Bruce L. Adams; Van C. Wilks

[57] ABSTRACT

A visual magnetic recording medium includes a magnetic-field sensitive display web layer united with one surface of a transparent substrate and having a multiplicity of microcapsules each containing a multitude of tiny particles, and a magnetic recording layer united with the display web layer. The tiny particles are responsive to a magnetic field established across the magnetic recording layer and produce an image on the display web layer which is visual through the transparent substrate. A method of making such visual magnetic recording medium is also disclosed.

16 Claims, 4 Drawing Sheets

VISUAL MAGNETIC RECORDING MEDIUM AND METHOD OF MAKING THE SAME

BACKGROUND OF THE INVENTION

1. Field of the Invention

The present invention relates to a visual magnetic recording medium capable of having produced thereon permanent but erasable visual recordings of various kinds of information, and a method of making such visual magnetic recording medium.

2. Prior Art

There have been proposed three types of recording mediums which are capable of having produced thereon a visual image of magnetically recorded information.

The first type of known recording medium comprises a magnetic recording card such as disclosed in Japanese Patent Publication (JP-B) No. 56-852. The disclosed magnetic card is composed of a magnetic recording layer, a base member of sheet material having an aperture or window therein, and a transparent sheet, these components being united one above another with the window sealingly and floatingly retaining therein fine magnetic particles. The fine magnetic particles are caused to be moved under the action of a magnetic field when selected areas of the magnetic recording layer are magnetized, thereby producing traces or images of recorded information which can be observed through the transparent sheet.

The second type of known recording medium is disclosed in Japanese Patent Publication (JP-B) No. 60-27003, in which a multiplicity of microcapsules each containing a liquid and magnetic particles (flakes) suspended in the liquid and a coloring material are coated over the front surface of a base member by means of a transparent binder, the base having a selected color. The magnetic flakes are changed in posture under the action of a proximal magnetic field in such a manner that when the flakes are oriented substantially parallel to the display surface, the color of the coloring material is observed in preference to the color of the base member, whereas when the flakes are oriented substantially perpendicular to the display surface, the color of the base member is observed in preference to the color of the coloring material.

The third type of known recording medium, as shown in Japanese Patent Publication (JP-B) No. 48-41221, includes a coating of microcapsules provided over one surface of a base member, the microcapsules containing tiny droplets of fluid, and highly reflective, magnetic flake-like particles suspended in the fluid. The magnetic flake-like particles are selectively oriented between a first position in which incident light rays striking the surface of the recording medium are reflected by the highly reflective, magnetic flake-like particles in a direction away from the base member, and a second position in which the incident light rays are scattered by the highly reflective, magnetic flake-like particles into the microcapsules and absorbed there. As a consequence, a visual contrast is created between an area in which the magnetic flake-like particles assume the first position, and an area in which the magnetic flake-like particles are disposed in the second position.

The first-mentioned recording medium or card is advantageous for its superior retentivity or memory of recorded information. This recording card however has a drawback in that due to the presence of the window in which the fine magnetic particles are contained, the window portion of the recording card is structurally weaker than the remaining portion. Accordingly, the recording card tends to be bent or folded over about the window portion. When subjected to undue or repeated bending forces, the recording card of a three-ply construction is likely to cause an interlamilar separation in the vicinity of the window portion or cause a permanent deformation on a portion of the magnetic recording layer which corresponds in position to the window portion. The magnetic card thus damaged cannot be used any more.

The second and third types of recording mediums do not have any window or opening and hence they are resistant to bending forces or stresses. However, these recording mediums have not been distributed to the market as they only have an information retentivity which is substantially lower than practically required. The reasons for such insufficient information retentivity are as follows.

In the recording mediums, the magnetic flake-like particles are preoriented parallel to the plane of the recording medium. When information is to be recorded, the recording medium is subjected to a recording magnetic field applied perpendicular to the plane of the recording medium. Those magnetic flake-like particles exposed to the magnetic field are reoriented substantially perpendicular to or at an angle to the plane of the recording medium while the flake-like particles not exposed to the magnetic field remain in their preoriented position parallel to the plane of the recording medium. As a result, a contrast is created due to the difference in reflectivity between the exposed flake-like particles and the unexposed flake-like particles, or due to scattering of the incident light rays by the exposed flake-like particles and reflection of the incident light rays by the unexposed flake-like particles.

The recorded information is retained for a long period of time even after the recording medium is separated from the recording magnetic field so long as the recording medium has a remnant magnetic force large enough to produce a local magnetic field which acts on the flake-like particles. As described above, the magnetic flake-like particles are preoriented in a position parallel to the plane of the recording medium for normally reflecting the incident light rays. Therefore, a magnetic field applied for the preorientation of the flake-like particles must have a certain strength. The preoriented flake-like particles are moved from the horizontal position into a tilted or substantially erect position for scattering the incident light rays when subjected to the recording magnetic field. When the recording magnetic field is removed, the individual flake-like particles each constitute a permanent magnet having north and south poles at opposite ends and are displaced relative to one another through repulsion and attraction between adjacent magnetized flake-like particles until the magnetic potential between all adjacent flake-like particles becomes minimal. The flake-like particles are thus aligned with lines of magnetic flux and retained in this aligned position against relative displacement, thus retaining or memorizing the recorded information. The relative displacement of the flake-like particles is achieved mainly under the action of the recording magnetic field, however, the flake-like particles as they are displaced concurrently receive a substantial influence of a remnant magnetic force produced by the preorienting magnetic field. The remnant magnetic force of the preorienting magnetic field interferes with a remnant magnetic force produced by the recording magnetic field. With this magnetic interference, the magnetism of the flake-like particles acting as permanent magnets is deteriorated for a relatively short period of time, thus lowering the information retentivity of the recording medium.

Furthermore, the recording mediums are likely to be stacked for storage or while in use in which instance the remnant magnetic force of one recording medium may exert a substantial influence upon flake-like particles in an adjacent recording medium, thereby lowering the information retentivity of the recording medium.

SUMMARY OF THE INVENTION

With the foregoing drawbacks of the prior art, it is an object of the present invention to provide a visual magnetic recording medium which is highly resistant to bending forces or stresses and has an improved retentivity of recorded information.

Another object of the present invention is to provide a visual magnetic recording medium which can be manufactured at a low cost, provides a higher contrast between the background and the portion of the recording sheet which has been exposed to a magnetic field, and is capable of immediately producing an image thereon in response to application of the magnetic field.

A further object of the present invention is to provide a method of making the foregoing visual magnetic recording medium.

According to a first object of the present invention, there is provided a visual magnetic recording medium comprising: a transparent substrate; a magnetic-field sensitive display web layer united with one surface of the transparent substrate and having a multitude of microcapsules each containing a multiplicity of tiny particles; a magnetic recording layer united with the display web layer remote from the transparent substrate; and the tiny particles being responsive to a magnetic field established across the magnetic recording layer and producing an image on the display web layer which is visible through the transparent substrate.

According to a second object of the present invention, there is provided a method of making a visual magnetic recording medium, comprising the steps of: providing a transparent substrate; coating one surface of the transparent substrate with a mixture of a multitude of microcapsules and a transparent binder and then drying the thus coated mixture to cure the same, thereby forming a microcapsular display web layer, each of the microcapsules containing a multiplicity of tiny particles responsive to a magnetic field; coating said microcapsular display web layer with a mixture of a multitude of fine magnetic particles and a binder and then drying the thus coated mixture to cure the same, thereby forming a magnetic recording layer; and providing a protective film layer over said magnetic recording layer.

Many other advantages and features of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION

Figure 1:
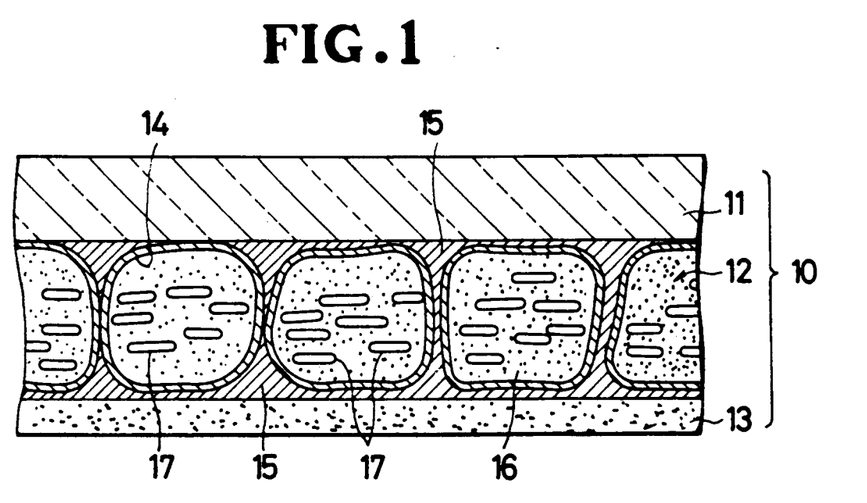
FIG. 1 is a vertical cross-sectional view of a portion of a visual magnetic recording medium according to the present invention.

As shown in FIG. 1, a visual magnetic recording medium 10 embodying the present invention generally comprises a sheet-like base member or substrate 11, a display layer 12 coated on one surface of the substrate 11, and a magnetic recording layer 13 bonded to or coated on the display layer 12. The substrate 11 constitutes the front side of the recording medium 10 and the magnetic recording layer 13 constitute the backside of the recording medium 10. The display layer 12 is formed of a microcapsular web of uniform thickness which is sensitive to a magnetic field. The magnetic-field sensitive display web layer 12 is composed of a multitude of microcapsules 14 retained or held together by a binder 15.

Each of the microcapsules 14 contains a tiny droplet of fluid 16 and a multiplicity of tiny magnetic flake-like particles 17 suspended in the fluid 16. The fluid 16 serves to facilitate or promote smooth movement of the magnetic flake-like particles 17 in the microcapsule 14. The flake-like particles 17 have a substantially uniform shape. The substrate 11, the microcapsules 14 and the binder 15 are made of transparent materials, so that a contrast which is created on the display layer 12 due to a difference in the reflectivity or coefficient of reflection between individual flake-like particles 17 can be observed from the front side of the recording medium 10.

The magnetic flake-like particles 17 contained in the microcapsules 14 are formed from a paramagnetic or ferromagnetic material which is highly reflective per se or is coated with a highly reflective material.

The encapsulating fluid 16 preferably is an oil or a mixture of oils which is chemically inactive to the magnetic flake-like particles 17 and has a lubricity capable of facilitating smooth movement of the flake-like particles 17.

The magnetic-field sensitive display web layer 12 composed of the microcapsules 14 and the binder 15 is formed as thin as possible, so that the magnetic flake-like particles 17 are subjected to a magnetic force produced by a recording magnetic field applied to the magnetic recording layer 13 when a certain kind of information is to be recorded on the recording medium 10. To this end, the microcapsular magnetic-field sensitive display web layer 12 is directly united with the magnetic recording layer 13 without interposition of a film sheet, thus minimizing the distance between the flake-like particles 17 in the microcapsules 14 and the magnetic recording layer 13.

The substrate 11 has a thickness large enough to strengthen the entire structure of the magnetic recording medium 10 to such an extent that the recording medium 10 sufficiently withstands forces or stresses applied thereto while in use. The microcapsules 14 are stably retained on the transparent substrate 11 as the transparent binder 15 has a relatively large contacting area relative to the substrate 11 and is larger in amount than the microcapsules 14.

The magnetic flake-like particles 17 in each microcapsule 14 are selectively orientable for reflecting incident light rays from the microcapsule 14 toward the substrate 11 and for scattering the incident light rays into the microcapsule 14 by the action of a magnetic field. Orientation of the flake-like particles is achieved under the action of a recording magnetic field applied to the magnetic recording layer 13 and a remnant magnetic force of the magnetic recording layer 13.

Dimensional features of the components of the two specific exemplary recording mediums will be described below.

EXAMPLE 1

| Thickness of substrate | 20 μm |
| Diameter of microcapsule | 20-40 μm |
| Length of major axis of magnetic flake-like particle | 3-10 μm |
| Thickness of magnetic recording layer | 15 μm |

EXAMPLE 2

| Thickness of substrate | 30-50 μm |
| Diameter of microcapsule | 30-50 μm |
| Length of major axis of magnetic flake-like particle | 3-10 μm |
| Thickness of magnetic recording layer | 20-30 μm |

The recording medium according to Example 1 is preferably used in the form of a single sheet or a continuous recording sheet while the recording medium of Example 2 is preferably used in the form of a portable magnetic card.

The visual magnetic recording medium 10 of the foregoing construction is treated in advance of practical use for preorienting the flake-like particles 17 in each microcapsule 14 in a position parallel to the general plane of the substrate 11. To this end, a preorienting magnetic field is exerted on the recording medium 10 from the substrate side or the magnetic recording layer side thereof in such a manner that every magnetic flake-like particle 17 is oriented with its major axis extending parallel to the general plane of the substrate 11. In this preoriented posture, since a highly reflective surface of the flake-like particle 17 lies parallel to the plane of the substrate 11 (or perpendicular to the direction of incident light rays), the incident light rays transmitted through the transparent substrate 11 onto the flake-like particles 17 are reflected by the highly reflective surfaces of the flake-like particles 14 and returned as reflected light rays through the transparent substrate 11 to the outside of the recording medium 10. The preorienting process of the magnetic flake-like particles 17 is also effected when the recorded information is to be erased.

Figure 2:
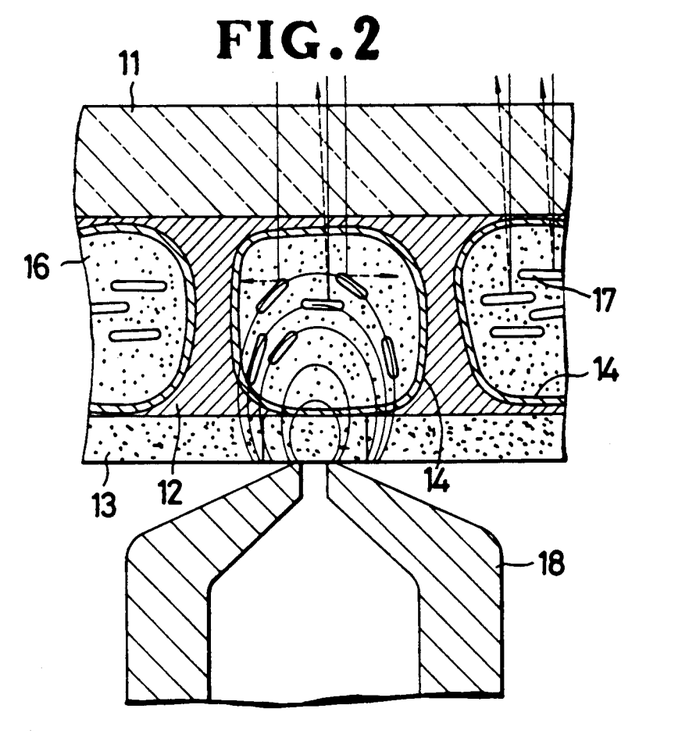
FIG. 2 is an enlarged view of a portion of FIG. 1, but illustrating the manner in which an image of recorded information is produced on the recording medium.

When a certain kind of information is to be recorded on the visual magnetic recording medium 10 in which the flake-like magnetic particles 17 have been preoriented, a recording magnetic field is established across the magnetic recording layer 13 and the magnetic-field sensitive display web layer 12 by using a magnetic head 18 held in contact with an outer surface of the magnetic recording layer 13, as shown in FIG. 2. The magnetic head 18 includes a plurality of aligned recording elements so arranged as to record a figure, a letter or a mark in the form of a group of dots.

As shown in FIG. 2, when the recording magnetic head 18 is energized in response to an input signal, a recording magnetic field is established across a portion of the magnetic recording layer 13, thereby magnetizing the same portion. The thus magnetized portion constitutes a permanent magnet having north and south poles at opposite ends thereof and retains a remnant magnetic force even after it is separated from the magnetic heat 18, so that the recorded information is retained or memorized in the magnetic recording layer 13. The recording magnetic field also acts on the inside of the microcapsules 14 disposed adjacent to the magnetized portion of the magnetic recording layer 13. The preoriented magnetic flake-like particles 17 in the microcapsules 14 exposed to the recording magnetic field are reoriented from the substantially horizontal position (FIG. 1) to a tilted (or erect) position parallel to lines of magnetic flux, as shown in FIG. 2. the reoriented position of each individual flake-like particle 17 is permanently but erasably memorized by lines of magnetic flux which are produced by a remnant magnetic force of the magnetic recording layer 13 rather than a remnant magnetic force of the flake-like particle 17 per se. Since the thus produced lines of magnetic flux are substantially identical to those produced at the recording, the recording medium 10 is free from a deterioration of magnetism of the flake-like particles 17 which would otherwise lower the information retentivity of the recording medium 10.

In the area of the recording medium 10 not exposed to the recording magnetic field nor to the magnetic field produced by the remast magnetic force of the recording layer 13, the flake-like particles 17 have not been reoriented but retain their substantially horizontal preoriented positions. Therefore, in this area, incident light rays striking the front side of the recording medium 10 are reflected by the highly reflective, magnetic flake-like particles 17 and returned as reflected light rays to the front side of the recording medium 10. However, in the area of the recording medium 10 exposed to the aforesaid magnetic fields, the incident light rays are scattered by the multiple reflective surfaces of the flake-like particles 17 in the microcapsules 14 and absorbed there. This scattering prevents the light rays from being reflected from the microcapsular display web layer 12 thereby creating a contrast. Thus, the trace formed by the reoriented area exposed to the magnetic fields appears as a dark image on the light background. In this manner, various kinds of information recorded in the magnetic recording layer 13 are reproduced on the display layer 12 in the form of letters, figures, symbols or the like.

The recording medium 10 on which the information has been recorded can repeatedly be used by passing the recording medium 10 successively through a preorienting device (not shown) and the recording device having the magnetic head 18 (FIG. 2). The recorded information in the recording medium 10 is erased as the latter is passed through the preorienting device. Alternatively, re-recording of the recording medium 10 may be carried out by passing the magnetic recording medium 10 through a recording device which includes an erasing head for producing an intense magnetic field to erase the recorded information and a recording magnetic head for recording another kind of information.

The visible magnetic recording medium 10 of the present invention has a wide variety of applications. For example, the recording medium 10 may be used in the form of a continuous recording sheet for observation, measurement or facsimile, a single sheet of a standardized size, or a card of a desired size. Advantageously, the magnetic recording medium 10 of the present invention enables it to record and display a considerably larger amount of information than the conventional recording medium having a window or aperture since its entire front surface can be used as a display surface.

The magnetic recording medium 10 may have a coating of coloring material such as dye or pigment on an outer surface of the magnetic recording layer 13, thereby providing a plain paper-like appearance.

Furthermore, the substrate 11 may have a coating so as to conceal or mask a part of the display web layer 12 in which instance a part of the magnetic recording layer corresponding in position to the concealed part is used as an area for recording the data to be read out through a magnetic head of a reading device.

Figure 3:
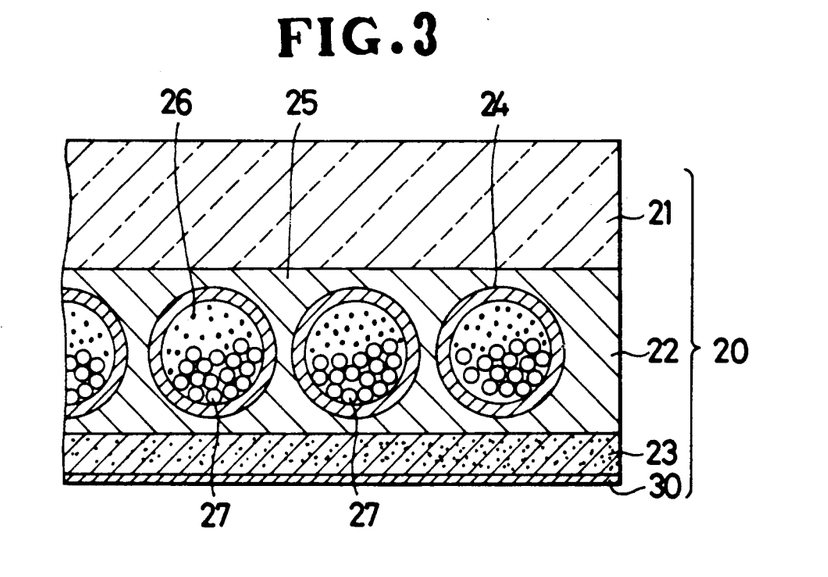
FIG. 3 is a view similar to FIG. 1, but showing a modified visual magnetic recording medium.

FIG. 3 shows a portion of a modified visual magnetic recording medium 20 according to the present invention. The magnetic recording medium 20 comprises a transparent base member or substrate 21 constituting a front display side of the recording medium 20, a magnetic-field sensitive web layer 22 coated on one side of the substrate 21 for constituting a display layer, and a magnetic recording layer 23 bonded or united to the magnetic-field sensitive display web layer 22. The display web layer 22 includes a multitude of transparent microcapsules 24 held or bound together by a transparent binder 25.

The substrate 21 preferably has a thickness of 20–100 μm when the recording medium 20 is used as a magnetic recording sheet. Alternatively, when the recording medium 20 is used in the form of a magnetic card, then the substrate 21 preferably has a thickness of 100–1000 μm.

Figure 4:
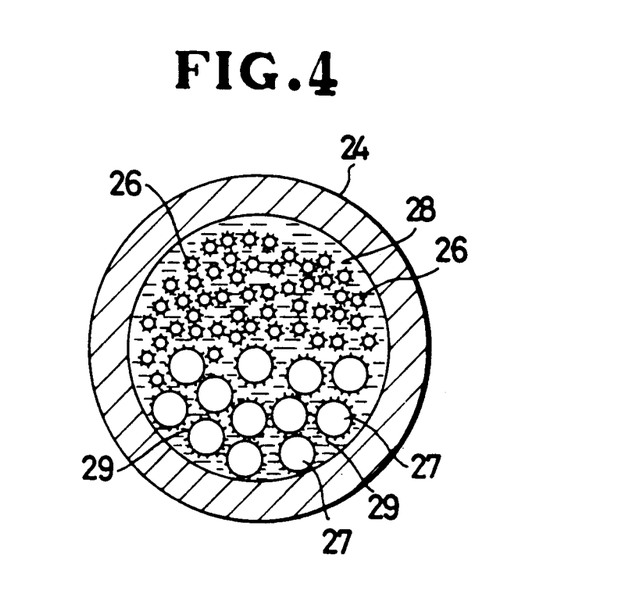
FIG. 4 is an enlarged cross-sectional view showing a microcapsule in the recording medium shown in FIG. 3.

Each of the microcapsules 24 has a chamber in which a fluid dispersion of magnetic and non-magnetic particles 26, 27 in a dispersing fluid or medium 28 is filled with the individual particles 26, 27 covered with a surfactant 29. The microcapsules 24 have an average diameter of about 30–50 μm.

The non-magnetic particles 27 have a specific gravity greater than the specific gravity of the magnetic particles 26 and also have a different color or reflectivity than that of the magnetic particles 26. The magnetic particles 26 may be formed from a ferromagnetic iron oxide such as $Fe_3O_4$. The non-magnetic particles 27 may be formed from white barium (Ba) when used with the magnetic particles 26 formed from a black iron oxide, thereby providing a sufficient contrast between the magnetic particles 26 and the non-magnetic particles 27. However, any other materials can be used for the non-magnetic particles 27 so long as such material is distinct from the magnetic particles 26 due to its specific gravity and color or reflectivity which are different from those of the magnetic particles 26 as described above. The volumetric ratio of the magnetic particles 26 to the non-magnetic particles 27 is not less than 1:1, and preferably, the magnet particles 26 are slightly greater in volume than the non-magnetic particles 27 for creating an image of a distinct contrast as described later on.

The surfactant 29 and the dispersing fluid 28 are used to keep the particles 26, 27 in such a dispersed state that the particles 26, 27 are highly flowable or mobile within the microcapsules 24. Since the surfactant 29 is ionized or charged, the particles 26, 27 are prevented from agglomerating in the dispersing fluid 28 by the repulsing action of ions of the same polarity of the thus charged surfactant 29. As a result, the fluid dispersion of the particles 26, 27 in the microcapsules 24 is kept in a stable colloidal state. The mobility of the particles 26, 27 is improved as the ratio of the diameter of the non-magnetic particles 26 to the diameter of the magnetic particles 26 is increased. An example of preferred combination of the magnetic and non-magnetic particles 26, 67 is such that the magnetic particles 26 are formed from an iron oxide of a spherical shape or an oval shape having an average diameter of about 100–130 Å, and the non-magnetic particles 27 have a spherical shape or an oval shape having an average diameter of about 3 μm.

The diameter of the microcapsules 24 and the thickness of the binder 25 are preferably made as thin as much as possible so as to enable the magnetic particles 26 in the microcapsules 24 to be exposed to a recording magnetic field applied to the magnetic recording layer 23 when a kind of information is recorded. To this end, the magnetic recording layer 23 is directly united with the microcapsules 24 and the binder 25, i.e. the magnetic-field sensitive display web layer 22 without interposition of a seal film layer, thus minimizing the distance between the magnetic recording layer 23 and the microcapsules 24. The outer surface of the magnetic recording layer 23 is covered with a protective film layer 30 of synthetic resin. The magnetic recording layer 23 preferably has a thickness of about 15—30 μm and the protective film layer 30 preferably has a thickness of about 2–3 μm.

The microcapsules 24 and the binder 25 are mixed with each other at a mixing ratio such that the binder 25 is united with the substrate 21 over the necessary bonding area for holding together the microcapsules 24 on the substrate 21 at a distribution ratio such that at least one microcapsule 24 is disposed at a unit recording area.

Figure 5:
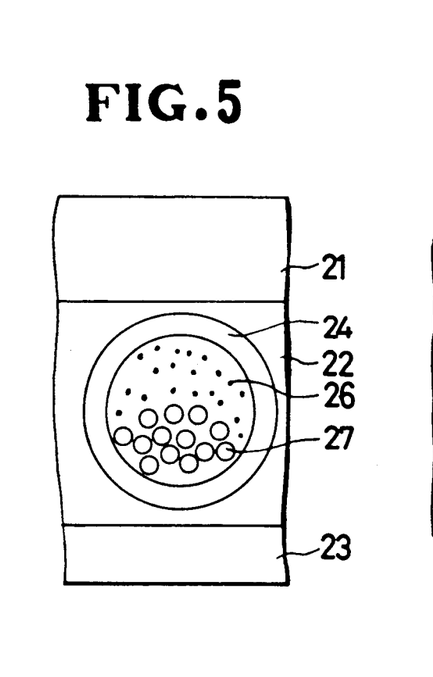
FIG. 5 is a schematic view showing the inside of a microcapsule which is not exposed to a magnetic field.

The magnetic recording medium 20 of the foregoing construction operates as follows. When the magnetic recording layer 23 is not exposed to a magnetic field, the non-magnetic particles 27 are settled to the bottom of each individual microcapsule 24 as they have a larger specific gravity than the magnetic particles 26, as shown in FIGS. 3–5. Conversely, the magnetic particles 26 are disposed at the top or front side of the microcapsule 24. In this instance, only a dark background appears on the front side of the recording medium 20 since the color of the magnetic recording particles 24 and the color of the magnetic recording layer 23 are observed through the transparent substrate 21 and the transparent binder 25.

Figure 6:
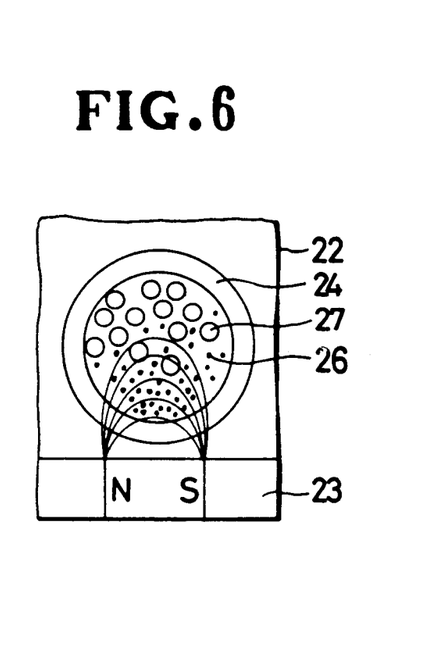
FIG. 6 is a view similar to FIG. 5, but showing the inside of the microcapsule which has been exposed to the magnetic field.

When a non-illustrated magnetic head is energized to establish a recording magnetic field across a portion or area of the magnetic recording layer 23, the area is magnetized by the recording magnetic field. The thus magnetized area attracts the magnetic particles 26 in a microcapsule 24 corresponding in position to the magnetized area, whereupon the magnetic particles 26 move from the front side to the bottom of the microcapsule 24 through spaces between the non-magnetic particles 27, as shown in FIG. 6. As a result, the non-magnetic particles 27 are displaced from the bottom to the front side of the microcapsule 24. This positional interchange is carried out smoothly and quickly because the average diameter (about 100–150 Å) of the magnetic particles 26 is considerably smaller than the average diameter (about 3 μm) of the non-magnetic particles 27 and hence the magnetic particles 26 as they are attracted toward the magnetic recording layer 23 are mobile between the non-magnetic particles 27 without resistance. This smooth and prompt position interchange is enhanced or promoted by the surfactant 29 (FIG. 4) surrounding the individual particles 26, 27. Furthermore, the particles 26, 27 of a spherical or an oval shape are responsive to the action of the magnetic field more rapidly than the flake-like particles and can be manufactured less costly than the flake-like particles. Consequently, the visual magnetic recording medium 20 can be manufactured at a low cost.

Figure 7:
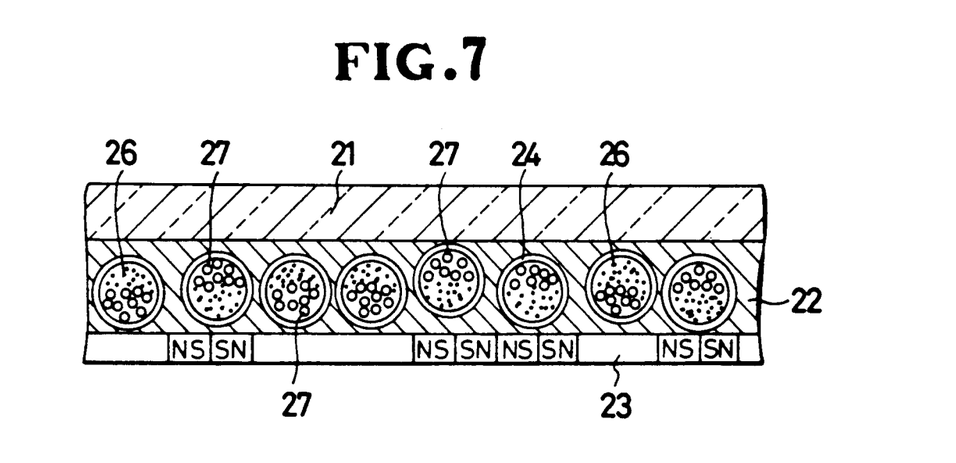
FIG. 7 is a schematic vertical cross-sectional view illustrative of the position of particles in each individual microcapsule relative to the state of magnetism of an area of a magnetic recording layer.

As described above, in the areas of the magnetic recording layer 23 exposed to the magnetic fields for recording information, the non-magnetic particles 7 are disposed at the front side of the microcapsules 24, whereas in the areas of the magnetic recording layer 23 not exposed to the recording magnetic fields, the magnetic particles 26 are disposed at the front side of the microcapsules 24, as shown in FIG. 7. As a consequence, there is created a contrast between the exposed area and the non-exposed area. The trace formed by the magnetic field appears as a light image on a dark background with the result that the recorded information is displayed by the color of the non-magnetic particles 27.

Since the magnetic particles 26 are greater in volume than the non-magnetic particles 27 in each individual microcapsule 24, the non-magnetic particles 27 are completely concealed by the magnetic particles 26, thus increasing the contrast of the displayed image to the background.

Figure 8:
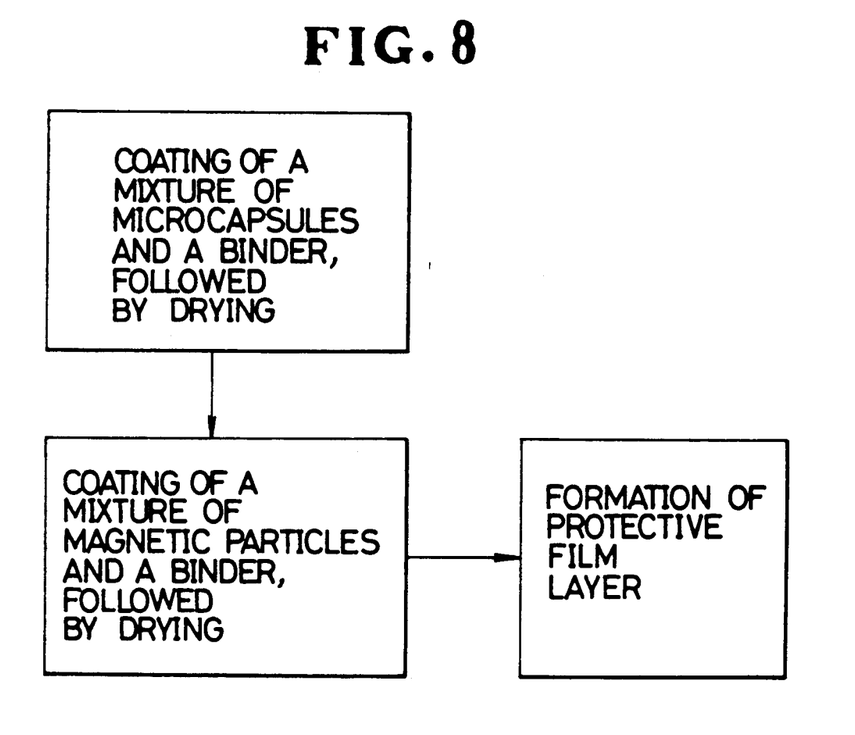
FIG. 8 is a block diagram showing successive processing steps for making the recording medium shown in FIG. 3.
Figure 9:
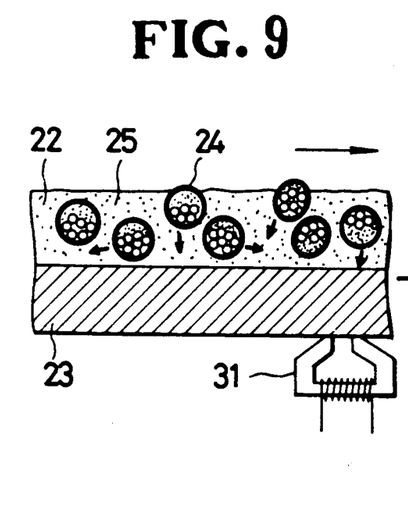
FIGS. 9 and 10 are diagrammatic cross-sectional views illustrative of the manner in which microcapsules are positionally stabilized.
Figure 10:
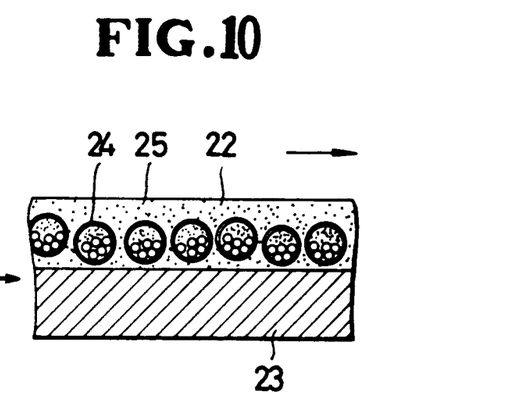

The visual magnetic recording medium 20 is manufactured in the manner as described below with reference to FIGS. 8 through 10.

At first, a sheet-like transparent base member or substrate 21 is prepared. The substrate 21 is preferably made of synthetic resin and has a thickness of 20–100 μm when the recording medium 20 is used for a recording sheet. When the recording medium 20 is used for a magnetic card, the substrate 21 preferably has a thickness of 100–1000 μm. Then one surface of the substrate 21 is coated with a mixture of a multitude of microcapsules 24 and a transparent solution binder 25 by a suitable means such as a coating roll, a coating brush, a spray or the like. The microcapsules 24 have an average diameter of 30–50 μm and containing black spherical magnetic particles of $Fe_3O_4$ having an average diameter of 100–150 Å and white spherical non-magnetic particles of Ba having an average diameter of about 3 μm.

The mixture thus coated has a thickness of about 40–60 μm.

It is preferred that the microcapsules 24 are distributed uniformly over the entire surface of the substrate 21 with small gaps or clearances defined between adjacent microcapsules 24. Such uniform distribution is achieved by properly adjusting the mixing ratio between the microcapsules 24 and the binder 25.

The thus coated mixture is then dried naturally or forcibly, thereby forming a microcapsular display web layer 22. During that time, the substrate 21 is kept in a horizontal position with the coated mixture facing upwardly, thus allowing the microcapsules 24 to settle by gravity down through the binder 25 to the inner surface of the substrate 21. The gravity settlement of the microcapsules 24 may be promoted by applying vibration to the substrate 21. The microcapsules 24 thus settled form a single layer over the inner surface of the substrate 21 with the result that the distance between the microcapsules 24 and a magnetic recording layer (described later on) can be reduced to the minimum. In case the uniform distribution of the microcapsules 24 is not obtained by the gravity settlement or the vibration-assisted gravity settlement, the mixture immediately after its application the substrate 21 may be subjected to an intensed magnetic field which is produced across the substrate 21 by means of a suitable magnetizing device such as a permanent magnet or an electromagnet 31 held in sliding contact with the outer surface of the substrate 21, as shown in FIG. 9. As the substrate 21 is advanced in the direction of the arrow over the electromagnet 31, the microcapsules 24 are moved toward the inside surface of the substrate 21 as the magnetic particles 26 in the microcapsules 24 are attracted toward the electromagnet 31, as shown in FIG. 10. The number of the magnetizing device 31 is not limited to one and two or more magnetizing devices may be employed, if necessary.

Thereafter, the thus formed microcapsular display web layer 22 is coated with a mixture of fine magnetic particles and a solution binder by a conventional method and then the thus coated mixture is dried naturally or forcibly by a conventional means, thereby forming a magnetic recording layer 23 of a thickness of 10–20 μm. Since the cured display web layer 22 has a smooth outer surface, the magnetic particles can be coated directly to the display web layer 22 without a sealing film layer. With this direct coating, the magnetic particles 26 in the microcapsules 24 are well responsive even when a magnetic field established across the magnetic recording layer 23 is weak or less intensive.

Finally, the outer surface of the magnetic recording layer 23 is covered with a protective film 30 (FIG. 3) of synthetic resin having a thickness of 2–3 μm. The protective film 30 serves to protect the magnetic recording layer 23 from abrasive wear which would otherwise occur when the visible magnetic recording medium 20 is being recorded (reading and writing) or carried by a user. The protective film 30 may be used as an area for carrying various kinds of printed information.

Obviously, various modifications and variations of the present invention are possible in the light of the above teaching. It is therefore to be understood that within the scope of the appended claims the invention may be practiced otherwise than as specifically described.

What is claimed is:

1. A visual magnetic recording medium comprising:
    (a) a transparent substrate;

(b) a magnetic field sensitive display web layer united with one surface of said transparent substrate and having a multiplicity of microcapsules held on said substrate by a transparent binder, each of said microcapsules containing a multitude of fine particles in suspension in a fluid, said fine particles being responsive to a magnetic field established across a magnetic recording layer overlying said display web layer to produce an image on said display web layer being which is visible though said transparent substrate; and (c) said magnetic recording layer being united with said display web layer remote from said transparent substrate.

2. A visual magnetic recording medium according to claim 1, wherein said fine particles comprise highly reflective magnetic flake-like particles, said flake-like particles being selectively orientable for reflecting incident light rays from said display web layer and for scattering the incident light rays in said microcapsules.

3. A visual magnetic recording medium according to claim 1, said fine particles being composed of a multiplicity of magnetic particles and a multiplicity of non-magnetic particles, said non-magnetic particles having a specific gravity greater than that of said magnetic particles and a color different from that of said magnetic particles, each said microcapsule containing a dispersion of said magnetic and non-magnetic particles in a dispersing fluid.

4. A visual magnetic recording medium according to claim 3, said non-magnetic particles having a reflectivity different from that of said magnetic particles.

5. A visual magnetic recording medium according to claim 3, said microcapsule further containing a surfactant.

6. A visual magnetic recording medium according to claim 3, said magnetic particles having an average diameter smaller than that of said non-magnetic particles.

7. A visual magnetic recording medium according to claim 6, said magnetic and non-magnetic particles having a spherical shape.

8. A visual magnetic recording medium according to claim 6, said magnetic and non-magnetic particles having an oval shape.

9. A visual magnetic recording medium according to claim 3, said magnetic particles being greater in volume than said non-magnetic particles.

10. A visual magnetic recording medium according to claim 3, said microcapsules having an average diameter of about 30–50 μm, said magnetic particles having an average diameter of about 100–150 Å, said non-magnetic particles having an average diameter of about 3 μm, and said magnetic recording layer having a thickness of about 15–30 μm.

11. A visual magnetic recording medium according to claim 3, said magnetic particles being formed from black particles of $Fe_3O_4$, and said non-magnetic particles being formed from white particles of Ba.

12. A visual magnetic recording medium according to claim 1, further including a protective film applied to an outer surface of said magnetic recording layer.

13. A method of making a visual magnetic recording medium comprising the steps of:

(a) providing a transparent substrate;

(b) coating one surface of said transparent substrate with a mixture of a multiplicity of microcapsules and a transparent binder and then drying the thus coated mixture to cure the same, thereby forming a microcapsular display web layer, each of said microcapsules containing a multitude of fine particles in suspension in a fluid, said fine particles being responsive to an applied magnetic field so as to orient themselves with the major axes thereof extending parallel to the general plane of said substrate;

(c) coating said microcapsular display web layer with a mixture of a multitude of fine magnetic particles and a binder and then drying the thus coated mixture to cure the same, thereby forming a magnetic recording layer; and (d) providing a protective film layer over said magnetic recording layer.

14. A method according to claim 13, including holding said substrate in a horizontal position with the coated mixture facing upwardly during said drying of the coated mixture, thus allowing said microcapsules to settle to an inner surface of said substrate.

15. A method according to claim 14, further applying vibration to said substrate and the mixture supported thereon.

16. A method according to claim 13, including immediately after said coating of said one surface of said substrate with the mixture of said microcapsules and said solution binder, subjecting said microcapsules to a magnetic field established across said substrate to attract said fine particles in said microcapsules, thereby displacing said microcapsules toward said one surface of said substrate.

* * * * *